US010447176B2

(12) United States Patent
Yamanaka

(10) Patent No.: US 10,447,176 B2
(45) Date of Patent: Oct. 15, 2019

(54) VIBRATION TYPE ACTUATOR CONTROL APPARATUS, APPARATUS HAVING THE SAME, AND STORAGE MEDIUM STORING VIBRATION TYPE ACTUATOR CONTROL PROGRAM

(71) Applicant: CANON KABUSHIKI KAISHA, Tokyo (JP)

(72) Inventor: Tomoaki Yamanaka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 492 days.

(21) Appl. No.: 15/377,025

(22) Filed: Dec. 13, 2016

(65) Prior Publication Data

US 2017/0194879 A1  Jul. 6, 2017

(30) Foreign Application Priority Data

Jan. 5, 2016 (JP) ................................ 2016-000532

(51) Int. Cl.
*H02N 2/00* (2006.01)
*H02N 2/06* (2006.01)
*G02B 7/08* (2006.01)

(52) U.S. Cl.
CPC ............. *H02N 2/008* (2013.01); *H02N 2/062* (2013.01); *G02B 7/08* (2013.01)

(58) Field of Classification Search
CPC ........... H02N 2/008; H02N 2/062; G02B 7/08
See application file for complete search history.

(56) References Cited

U.S. PATENT DOCUMENTS

| 2007/0133970 A1* | 6/2007 | Honjo | G02B 7/08 396/97 |
| 2013/0249445 A1* | 9/2013 | Sumioka | H02N 2/142 318/116 |
| 2015/0125140 A1* | 5/2015 | Ashizawa | G03B 3/10 396/125 |
| 2015/0146080 A1* | 5/2015 | Morita | H02N 2/062 348/345 |
| 2016/0329837 A1* | 11/2016 | Kataoka | H02N 2/142 |
| 2017/0279380 A1* | 9/2017 | Atsuta | H02N 2/142 |

FOREIGN PATENT DOCUMENTS

JP         2010166736 A     7/2010

* cited by examiner

*Primary Examiner* — J. San Martin
(74) *Attorney, Agent, or Firm* — Rossi, Kimms & McDowell LLP

(57) ABSTRACT

A vibration type actuator control apparatus is configured to control driving of a vibration type actuator configured to move a moving body that is one of the vibrator and a contact body that contacts a vibrator. The vibration type actuator includes the vibrator in which a vibration is excited when a two-phase drive signal having a phase difference is applied to an electro-mechanical energy conversion element. The vibration type actuator control apparatus includes a drive signal generator configured to generate the two-phase drive signal. The drive signal generator changes a phase difference of the two-phase drive signal from an initial phase difference when the moving body is moved from a stopped state. The initial phase difference is determined based on a phase difference shift indicative of a shift from a phase difference set so as to stop the moving body.

11 Claims, 12 Drawing Sheets

VIBRATION TYPE ACTUATOR CONTROL APPARATUS, APPARATUS HAVING THE SAME, AND STORAGE MEDIUM STORING VIBRATION TYPE ACTUATOR CONTROL PROGRAM

BACKGROUND OF THE INVENTION

Field of the Invention

The present invention relates to a control technology of a vibration type actuator using an electro-mechanical energy conversion element ("piezoelectric element" hereinafter).

Description of the Related Art

The vibration type actuator includes a vibrator in which a vibration, such as an elliptical motion, is excited when a drive signal as a two-phase frequency signal having a phase difference is applied to the piezoelectric element, and moves a moving body among the vibrator and a contact body that contacts the vibrator (moves the vibrator and the contact body relative to each other). A method for controlling driving of this vibration type actuator (moving of the moving body) includes a frequency control that changes a frequency of the two-phase drive signal and a phase difference control that changes a phase difference of the two-phase drive signal. The frequency control is likely to control high-speed driving, and the phase difference control can provide a lower-speed control than the frequency control. A phase difference range near 0° or 180° in the phase difference control is a so-called dead zone in which an unstable drive state reduces a generated drive force and finally stops driving. The influence of the dead zone can lower the controllability of the vibration type actuator.

In order to reduce the influence of the dead zone, Japanese Patent Laid-Open No. 2010-166736 discloses a control method for changing a frequency without changing a phase difference in the low-speed driving that causes an unstable speed in the phase difference control.

However, even if the frequency control is performed in the dead zone of the phase difference control, it is difficult for the frequency control to provide low-speed driving as well as the phase difference control and to perform desired low-speed driving. In addition, since a relationship (characteristic) between the phase difference and the speed of the vibration type actuator has an individual difference, a phase difference control needs to fit each individual vibration type actuator.

SUMMARY OF THE INVENTION

The present invention provides a vibration type actuator control apparatus and a vibration type actuator control program, which can reduce a drop of controllability caused by a dead zone although there is an individual difference in a relationship between a phase difference and a speed of a vibration type actuator.

A vibration type actuator control apparatus according to one aspect of the present invention is configured to control driving of a vibration type actuator configured to move a moving body that is one of the vibrator and a contact body that contacts a vibrator. The vibration type actuator includes the vibrator in which a vibration is excited when a two-phase drive signal having a phase difference is applied to an electro-mechanical energy conversion element. The vibration type actuator control apparatus includes a drive signal generator configured to generate the two-phase drive signal. The drive signal generator changes a phase difference of the two-phase drive signal from an initial phase difference when the moving body is moved from a stopped state. The initial phase difference is determined based on a phase difference shift indicative of a shift from a phase difference set so as to stop the moving body.

Further features of the present invention will become apparent from the following description of exemplary embodiments with reference to the attached drawings.

DESCRIPTION OF THE EMBODIMENTS

Referring now to the accompanying drawings, a description will be given of an embodiment of the present invention.

First Embodiment

Figure 1:
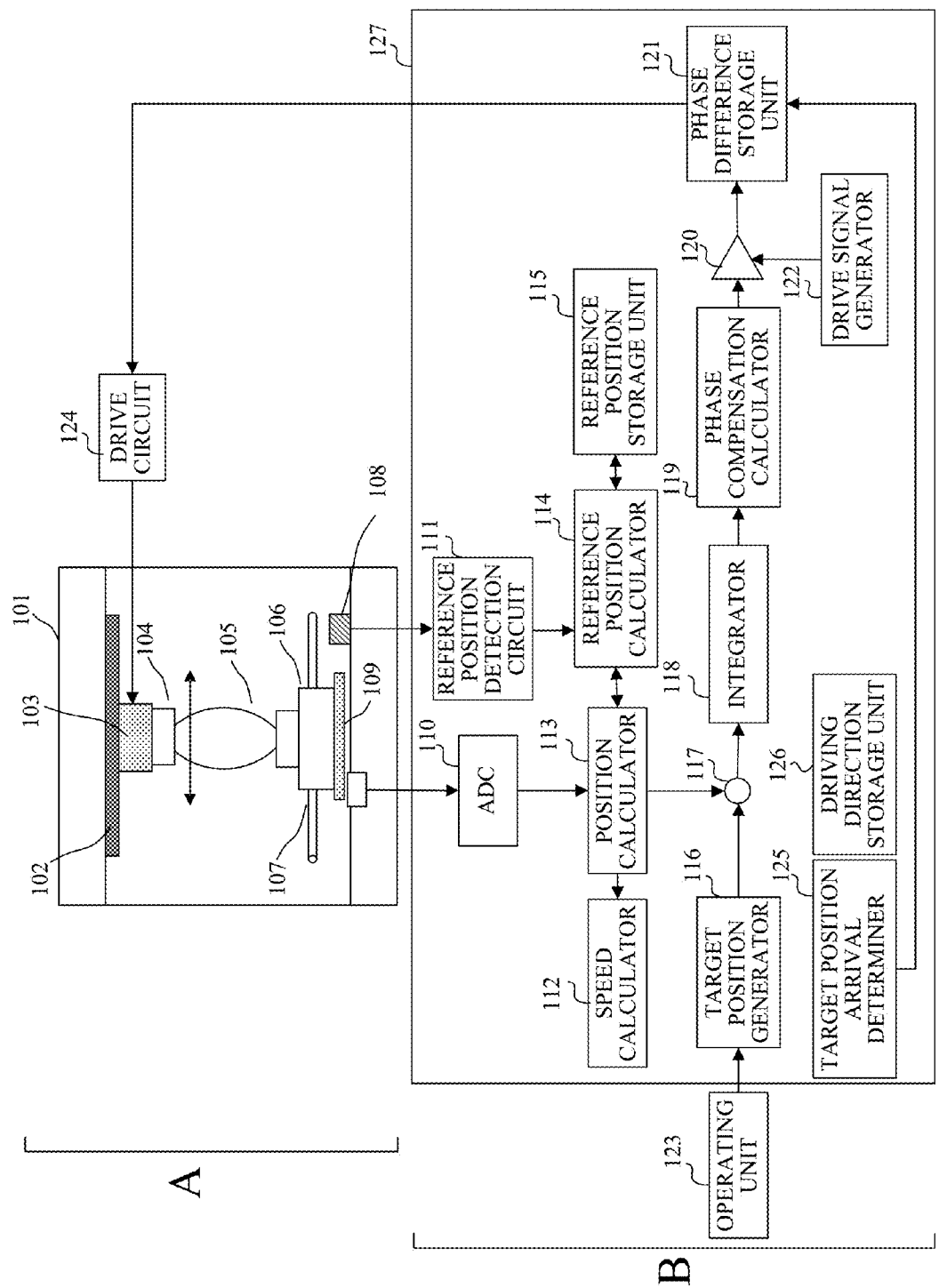
FIG. 1 is a block diagram of a configuration of a lens driver using a vibration type actuator according to a first embodiment of the present invention.

FIG. 1 illustrates a configuration of a lens driver A configured to drive a lens as a driven member in a lens apparatus as an apparatus (optical apparatus) according to a first embodiment of the present invention and a control block B configured to control the lens driver A.

In the lens driver A, reference numeral 101 denotes a fixed lens barrel configured to house an optical system including a lens 105. Reference numeral 102 denotes a friction member as a contact body fixed on an inner surface of the fixed lens barrel 101. The friction member 102 is made of a material having a high friction coefficient and a friction durability. Reference numeral 103 is a vibrator that includes a piezoelectric element as an electro-mechanical energy conversion element and an elastic body onto which the piezoelectric element is fixed, and forms a vibration type actuator. The vibrator 103 compressively contacts the friction member 102 by a spring force, a magnetic force, etc.

When an electric signal (a frequency signal such as a sine signal and a pulsed signal) that periodically changes as a two-phase drive signal having a phase difference is applied to the piezoelectric element in the vibrator 103, a vibration as an elliptical motion is excited in the contact body in the elastic member in the vibrator 103 with the friction member 102. This configuration moves the vibrator 103 as a moving body relative to the friction member 102 or the fixed lens barrel 101 (or moves the vibrator 103 and the friction member 102 relative to each other).

Instead of the configuration illustrated in FIG. 1, the vibrator 103 may be fixed on the fixed lens barrel 101 and the friction member 102 may be configured movable as a moving body.

Reference numeral 104 denotes a lens holder fixed onto the vibrator 103, and holds the lens 105, such as a focus lens and a magnification-varying lens. Reference numeral 106 denotes a sleeve integrated with the lens holder 104, and is engaged with a guide bar 107 fixed in the fixed lens barrel 101 so that the sleeve 106 can move in an arrow or optical axis direction. As the vibrator 103 moves, the lens 105 held by the lens holder 104 moves in the optical axis direction.

A position sensor (detector) 109 detects a position of the lens 105. The position sensor 109 can use an optical encoder that includes an optical scale having a bright and dark pattern fixed, for example, onto the lens holder 104, and an optical sensor fixed onto the fixed lens barrel 101 and configured to receive light emitted from a light emitter and reflected on the optical scale. Alternatively, the position sensor 109 may use a magnetic encoder that includes a magnetic scale fixed onto the lens holder 104 and having a magnetic pattern, and a magnetoresistance device (MR sensor) fixed onto the fixed lens barrel 101 and configured to detect a magnetic change from the magnetic scale.

An analog detection signal output from the position sensor 109 is input to a control CPU 127 as a vibration type actuator control apparatus provided in the control block B. In the control CPU 127, an AD converter 110 converts the analog detection signal from the position sensor 109 into a digital detection signal. Reference numeral 113 denotes a position calculator configured to convert the digital detection signal from the AD converter 110 into position data indicative of the position of the lens 105 (or the position of the vibrator 103 as the moving body). In the following description, a position represented by this position data will be referred to as a "detected position." Reference numeral 112 denotes a speed calculator configured to convert, into a speed, a change amount of the detected position obtained at predetermined periodic intervals. Alternatively, a speed sensor configured to directly detect a speed of the lens 105 may be provided.

Reference numeral 108 denotes a reference position sensor configured to detect that the lens 105 is located on the reference position. The reference position sensor 108 may use a photo-interrupter including a light emitter and a light receiver. For example, a light shield is provided onto the lens holder 104, and an output of the light receiver changes from high to low or low to high when the light shield is inserted into a space between the light emitter and the light receiver in the photo-interrupter. Reference numeral 111 denotes a reference position detection circuit including, for example, a buffer circuit with a Schmitt trigger function and detects a signal output from the reference position sensor 108. Reference numeral 114 denotes a reference position calculator configured to calculate a reference position, and reference numeral 115 denotes a reference position storage unit configured to store the reference position.

In order to obtain an absolute position of the lens 105, a trailing edge of the photo-interrupter from high to low is detected, for example, and the reference position storage unit 115 stores, as the reference position, the position obtained from the reference position detection circuit 111. Thereafter, the absolute position can be calculated by calculating a difference between the reference position and the detected position sequentially obtained by the position calculator 113.

Where the position sensor 109 includes a potentiometer and is a sensor configured to detect the absolute position, the reference position sensor 108 and the reference position detection circuit 111 are unnecessary so as to detect the reference position.

Reference numeral 116 denotes a target position generator configured to generate a target position of the lens 105. As an operating unit 123 is operated, the target position generator 116 generates a target position in accordance with the operation. That the target position generator 116 changes the target position for each micro time period corresponds to generating a speed command.

Reference numeral 117 denotes a subtractor configured to generate a deviation signal by calculating a difference between the detected position (actual position) of the lens 105 output from the position calculator 113 and the target position generated by the target position generator 116. The deviation signal is converted into a control signal for obtaining the drive signal via an integrator 118, a phase compensator 119, and a gain controller 120. The control signal for the vibration type actuator contains information of a frequency and a phase difference of the two-phase drive signal. The thrust and speed of the vibration type actuator is controlled by changing the frequency or phase difference of the two-phase drive signal. The integrator 118 serves to reduce a deviation that would occur in the stop state, and to follow the target position even when disturbance, such as an impact, is applied. The phase compensator 119 is provided to avoid the oscillation of the vibration type actuator caused by a phase lag. The gain controller 120 provides a fine adjustment to the responsiveness and stability of the vibration type actuator and the coefficient conversion.

Reference numeral 125 denotes a determiner configured to determine whether the detected positon of the lens 105 output from the position calculator 113 has reached the target position generated by the target position generator 116. When the detected position reaches the target position, the determiner 125 stops vibrating the vibrator 103 or continues the feedback control so that the detected position can stay at the target position.

Reference numeral 122 denotes a memory configured to store a phase difference. Reference numeral 126 denotes a drive direction storage unit configured to store a drive direction of the lens 105 (vibrator 103). A description will be given later of a condition of obtaining the phase difference stored in the memory 122. Reference numeral 121 denotes a drive signal generator configured to generate the two-phase drive signal while controlling its frequency and phase difference, and to output the two-phase drive signal to the drive circuit 124, using a calculated control signal or a phase difference stored in the memory 122.

The drive circuit 124 amplifies a drive signal from the drive signal generator 121 and applies the amplified drive signal to the vibrator 103 (photoelectric element). Thereby, the vibration is excited in the vibrator 103, and the vibrator 103 is moved with the lens 105.

Figure 2:
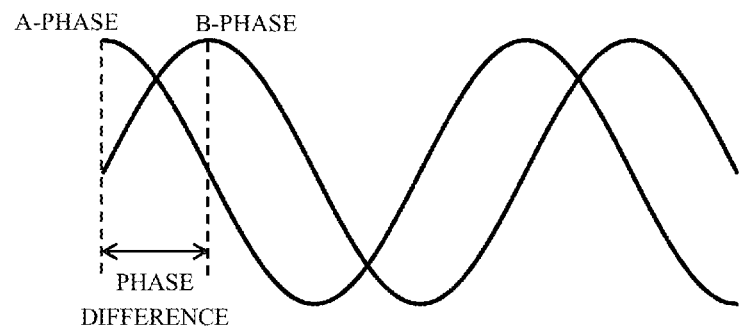
FIG. 2 is a view illustrating a drive signal for driving the vibration type actuator according to the first embodiment.
Figure 3:
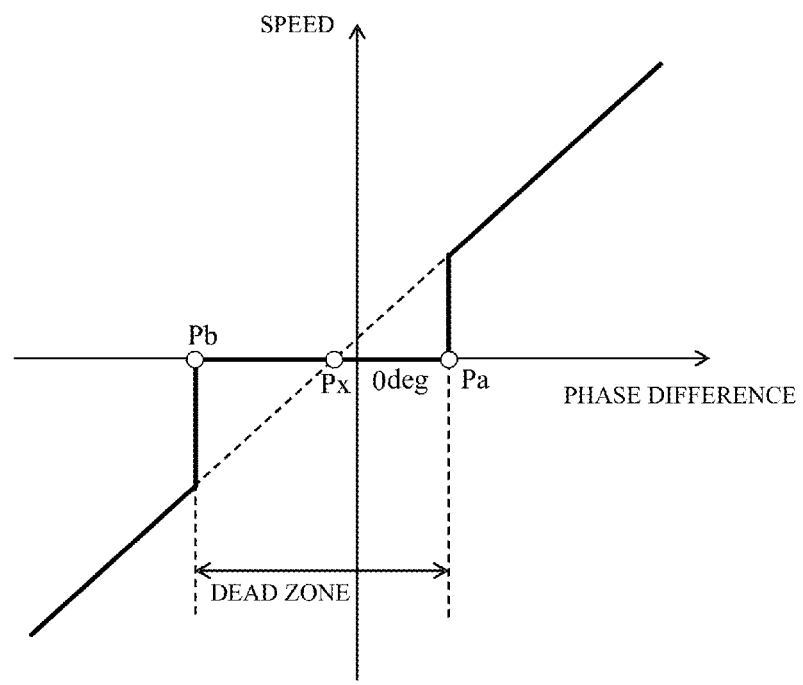
FIG. 3 is a view illustrating a characteristic between a phase difference and a speed of the vibration type actuator according to the first embodiment.

FIG. 2 illustrates an illustrative waveform of the two-phase drive signal (A phase and B phase) generated by the drive signal generator 121. As illustrated, the "phase difference" in the two-phase drive signal means a phase shift amount in the drive signals. FIG. 3 illustrates a relationship between the phase difference and the speed of the vibration type actuator (moving speed of the vibrator 103 in this embodiment). Herein, 0° is an ideal phase difference that provides a speed of 0. The phase difference of 180° is treated as that of 0°.

The actual vibration type actuator has a dead zone that zeros the speed, as described above, even when the phase difference is not 0° (or)180°. In FIG. 3, the dead zone is a phase difference range between Pa (positive value: first phase difference) and Pb (negative value: second phase difference). Moreover, the vibration type actuator has an individual difference caused by manufacturing errors, for example, in an electrode of the piezoelectric element and a shape of the vibrator. The absolute values of Pa and PB are opposite to each other in FIG. 3, and the center value between Pa and PB is a phase difference Px that is offset from 0° (and different from 0° or)180°.

Figure 4:
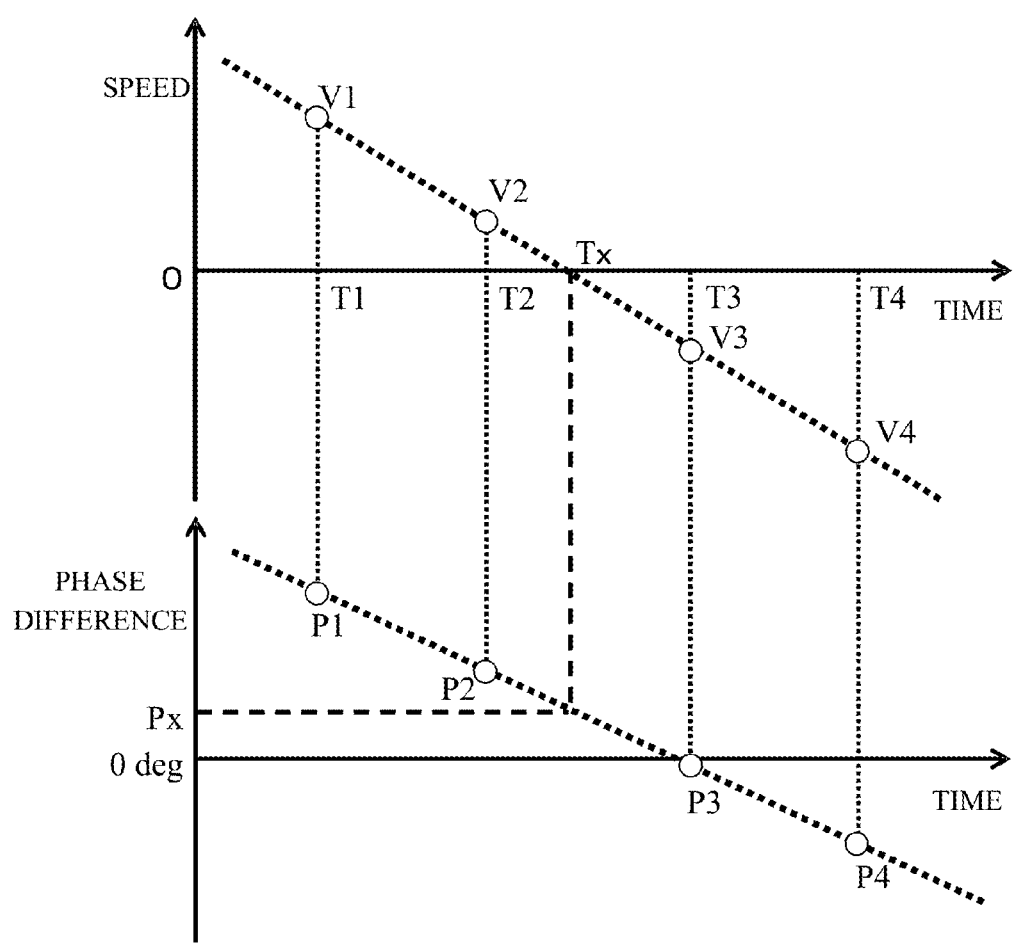
FIG. 4 is a view illustrating a relationship between a speed of the vibration type actuator according to the first embodiment and time, and a relationship between a phase difference for the vibration type actuator and time.
Figure 5:
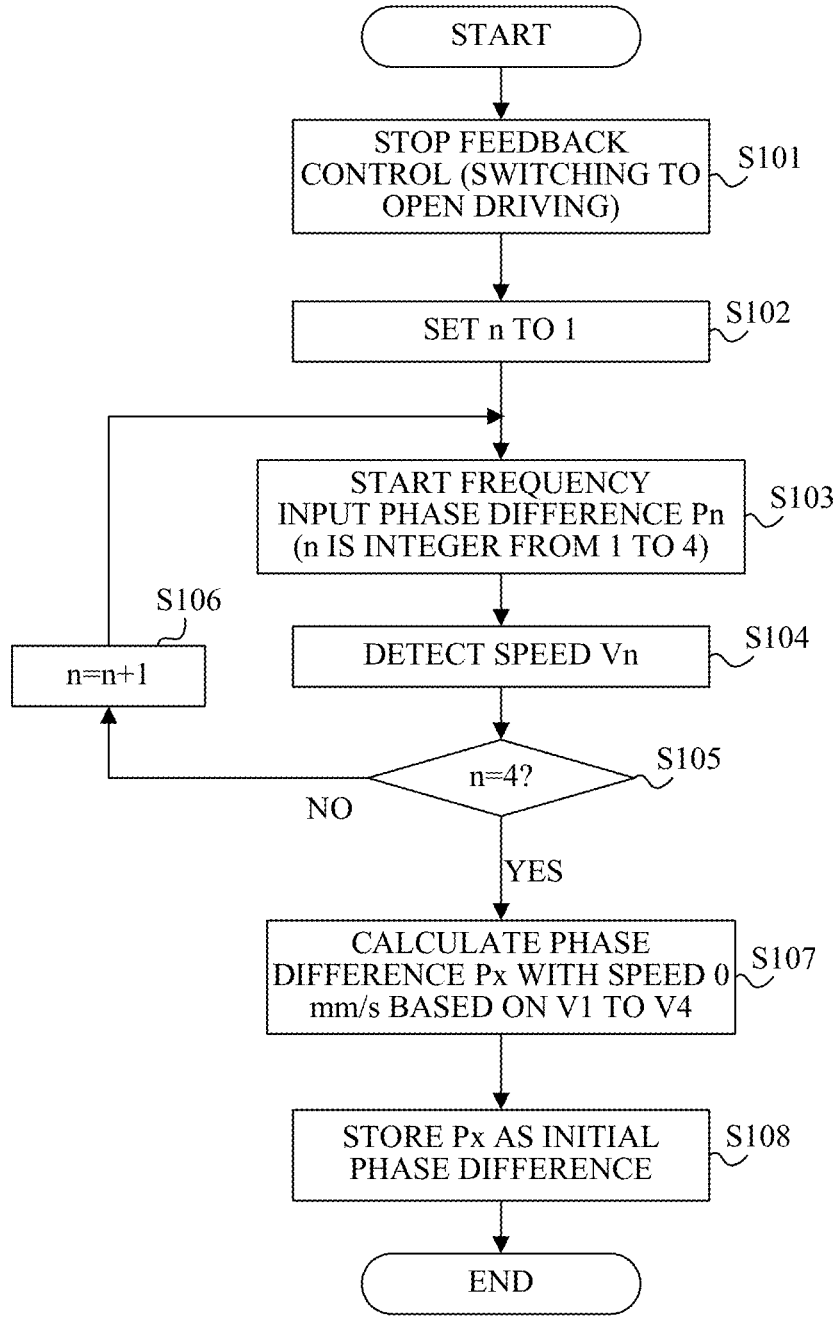
FIG. 5 is a flowchart of a process for detecting a phase difference Px of the vibration type actuator according to the first embodiment.

Referring now to FIGS. 4 and 5, a description will be given of a control of driving of the vibration type actuator according to this embodiment. In the following description, a moving speed and a moving direction of the vibrator 103 will be referred to as a speed and drive direction of the vibration type actuator.

FIG. 4 illustrates a relationship between the speed of the vibration type actuator and time, and a relationship between the phase difference for the vibration type actuator and time, representing a change of the speed (V1>V2>0>V3>V4) where the phase difference is changed from positive to negative (P1>P2>0°>P3>P4). In the following description, the drive direction of the vibration type actuator is a forward direction (first moving direction) when the phase difference is set to P1 and P2 as positive values, and the drive direction of the vibration type actuator is a backward direction (second moving direction) opposite to the forward direction when the phase difference is set to P3 and P4 as negative values. At time Tx, the speed is 0 and the phase difference is Px.

A description will be given of a process for calculating the phase difference PX using a flowchart illustrated in FIG. 5. This process is executed by the control CPU 127 in accordance with part of a vibration type actuator control program as a computer program.

In the step S101, the control CPU 127 stops the feedback control and switches to the open driving. Thereby, the drive signal generator 121 generates the two-phase drive signal irrespective of the deviation signal.

Next, in the step S102, the control CPU 127 initializes the counter (counted value) n to 1 so as to determine which number of phase difference is to be set.

Next, in the step S103, the control CPU 127 inputs the frequency (start frequency) and the phase difference Pn (n is an integer from 1 to 4) of the two-phase drive signal to be generated. P1 to P4 are set in a range from the positive value to the negative value, and the range may contain Px that provides a speed of 0.

Next, in the step S104, the control CPU 127 detects the speed Vn of the vibration type actuator. In the step S105, the control CPU 127 determines whether the counter n has reached 4. When the counter n is not 4, the counter is incremented by 1 in the step S106 so as to continue to detect the change and speed of the phase difference and the flow returns to the step S103. On the other hand, when the counter n is 4, the control CPU 127 moves to the step S107, and calculates (estimates) the phase difference Px that provides the speed of 0 using V1 to V4 detected in the step S104. More specifically, the control CPU 127 calculates an approximated line that connects V1 to V4 and an intersection as Tx between the approximated line and the abscissa axis that provides the speed of 0. Next, the control 127 calculates an approximate line that connects P1 to P4 and a phase difference Px at time Tx based on the approximated line.

A description will be given of a time interval that repeats S103 to S106 (for example, an interval between T1 and T2 in FIG. 4). When the time interval is too long, the phase difference Px cannot be precisely obtained because the dead zone occurs as illustrated in FIG. 3. Therefore, it is necessary to set the time interval enough short for the vibration type actuator not to stop due to the dead zone, and enough long for its drive direction to invert from the forward direction to the backward direction due to the inertia force.

The time necessary to calculate the phase difference Px can be shortened by simplifying the process illustrated in FIG. 5. More specifically, in the steps S103 to S106 illustrated in FIG. 5, the phase difference may be set only to P1 and P2 (P1>0°>P2), and a line connecting the obtained speeds V1 and V2 (V1>0>V2) with each other is found. Then, Tx is found as an intersection between the line and the abscissa axis that provides the speed of 0. Next, a line connecting P1 and P2 with each other is found, and a phase difference Px is found at time Tx based on this line. Even in this case, it is necessary to set the time interval for repeating the steps S103 to S106 enough short for the vibration type actuator not to stop due to the dead zone, and enough long for its drive direction to invert from the forward direction to the backward direction due to the inertia force.

In the step S108, the control CPU 127 stores the thus calculated phase difference Px as the center phase difference (initial phase difference) in the memory 122.

Thus, this embodiment decreases the phase difference of the two-phase drive signal down to 0 on one of the positive side and the negative side (positive side in this embodiment), and then increases it on the other of the positive side and the negative side (negative side in this embodiment). In addition, the center phase difference Px is stored as the initial phase difference between the phase difference Pa when the vibration type actuator stops driving in the forward direction and the phase difference Pb when the vibration type actuator starts driving in the backward direction. Alternatively, the center phase difference Px may be calculated by decreasing the phase difference on the negative side down to 0 and then by increasing it on the positive side. In this case, the backward direction corresponds to the first moving direction, and the forward direction corresponds to the second moving direction.

After storing the initial phase difference Px, the control CPU 127 drives the vibration type actuator from the stopped state through the feedback control in accordance with the above control program. In this case, the frequency is fixed onto the start frequency and the two-phase drive signal is generated. The control CPU 127 (drive signal generator 121) sets the center phase difference Px stored in the memory 122 to the initial value (initial phase difference) of the phase difference of the two-phase drive signal, and thereafter changes (increases) the phase difference of the two-phase drive signal from the center phase difference Px (phase difference control).

Now, a drive start time period is defined as a time period from when the phase difference from the center phase difference Px starts changing to when the vibrator 103 starts moving. Assume that the phase difference is changed from the center phase difference Px in the positive and negative directions with equal change rates. At this time, the center phase difference Px is a phase difference that minimizes a time difference (ideally 0) between the drive start time period when the phase difference is changed in the positive direction (or the vibrator 103 is moved in the forward direction) and the drive start time period when the phase difference is changed in the negative direction (or the vibrator 103 is moved in the backward direction).

This embodiment can reduce the influence of the dead zone irrespective of the drive direction when the vibration type actuator starts moving from the stopped state, and restrain the driving start lag of the vibration type actuator and a difference of the driving start time period between the drive directions. In other words, this embodiment can improve the controllability in the drive start. In particular, even when the relationship between the phase difference and the speed of the vibration type actuator has an individual difference, this embodiment can reduce a drop of the controllability of the vibration type actuator caused by the influence of the dead zone.

Second Embodiment

Next follows a description of the second embodiment according to the present invention. The above first embodiment calculates the center phase difference by inverting the drive direction of the vibration type actuator, and starts a phase difference control from the stopped state of the vibration type actuator by setting the center phase difference to the initial phase difference. On the other hand, the second embodiment calculates the initial phase difference for each drive direction, and improves the influence of the dead zone in the drive start irrespective of the drive direction.

Figure 6:
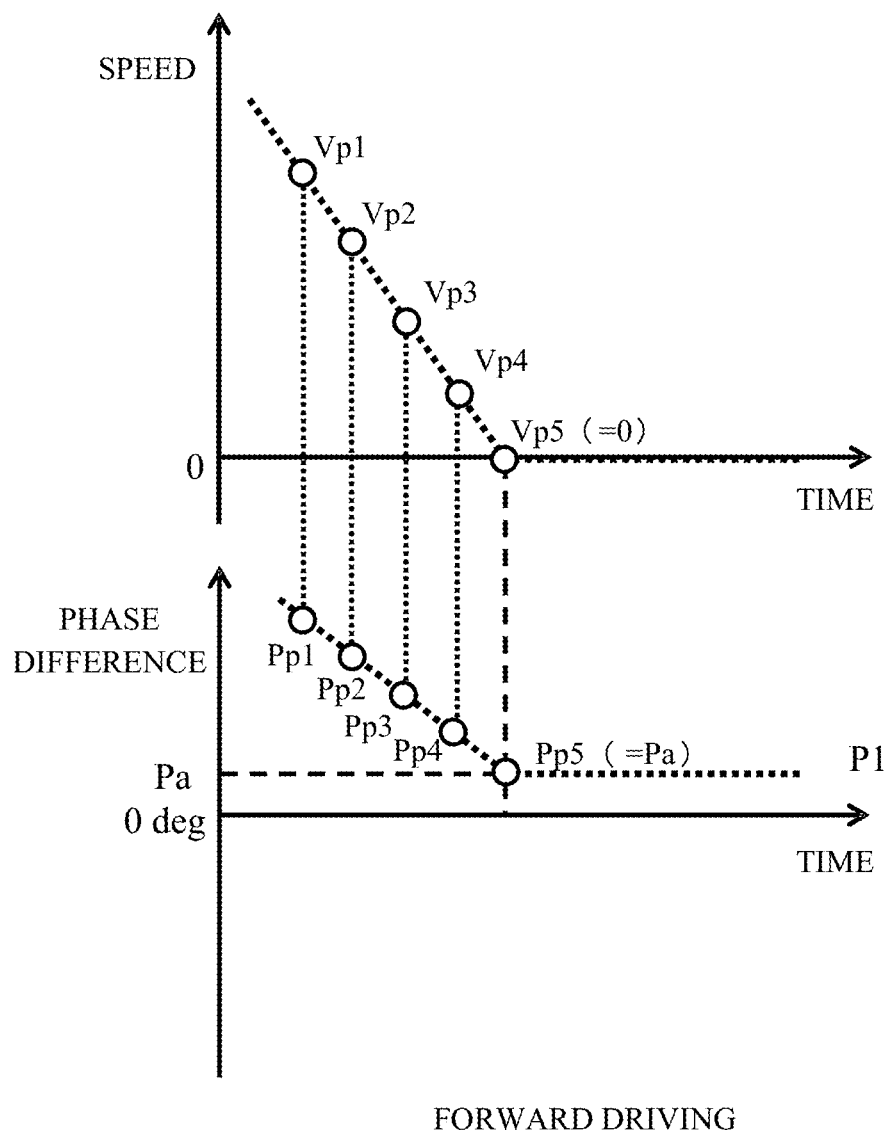
FIG. 6 is a view illustrating a relationship between a speed of the vibration type actuator according to a second embodiment according to the present invention and time, and a relationship between a phase difference for the vibration type actuator and time.

Initially, a phase difference Pa is calculated which provides the speed of 0 and is different from 0° or 180° where the vibration type actuator is driven in a forward direction. FIG. 6 illustrates a relationship among the speed, the phase difference, and time in this case. In FIG. 6, a phase difference as a positive value is gradually decreased from Pp1 to Pp5 and the speed of the vibration type actuator is decreased from Vp1 to Vp5. The speed Vp5 is 0, and the corresponding phase difference Pp5 is stored as the initial phase difference (first initial phase difference) Pa in the forward direction in the memory 122.

Figure 8:
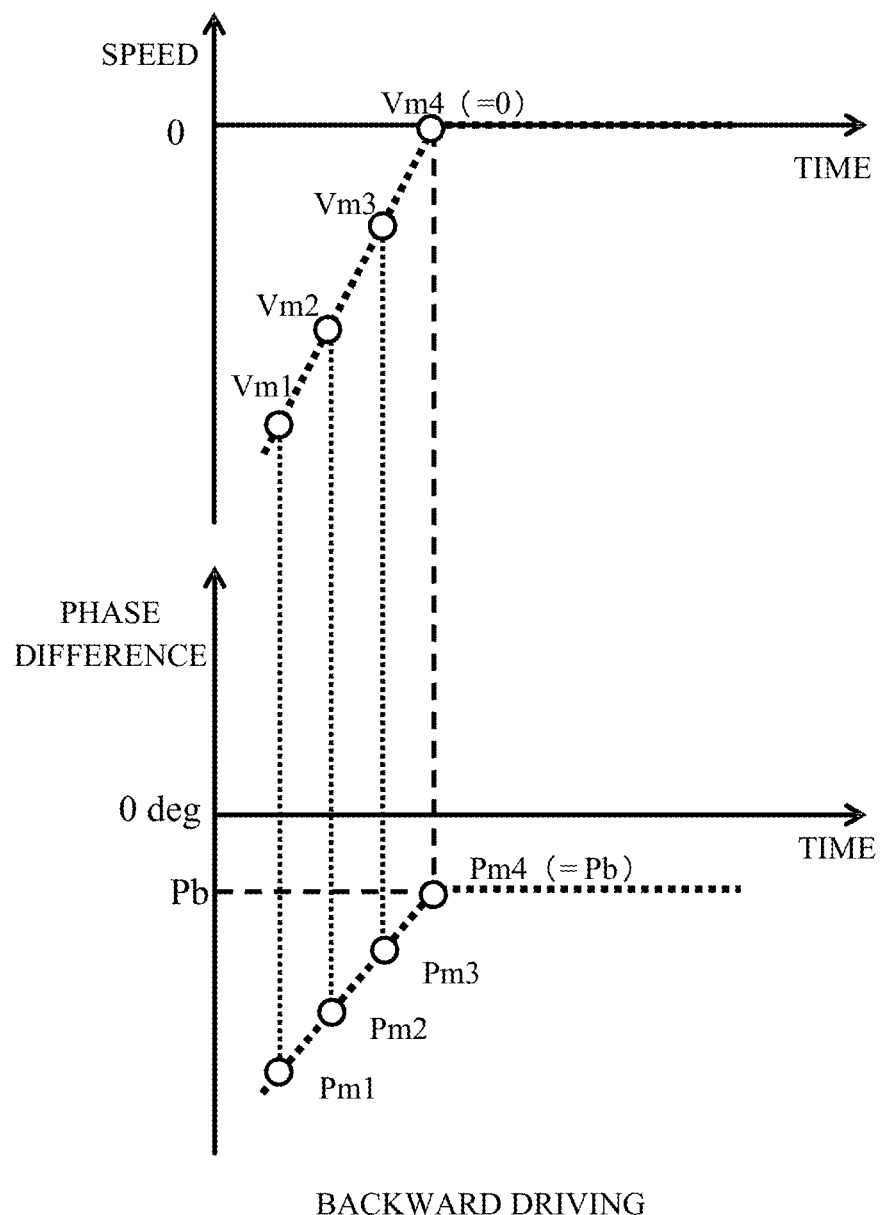
FIG. 8 is a view illustrating a relationship between a speed of the vibration type actuator according to the second embodiment and time, and a relationship between a phase difference for the vibration type actuator and time.

In addition, a phase difference Pb is calculated which provides the speed of 0 and is different from 0° or 180° where the vibration type actuator is driven in a backward direction. FIG. 8 illustrates a relationship among the speed, the phase difference, and time in this case. In FIG. 8, a phase difference as a negative value is gradually decreased from Pm1 to Pm4 and the speed of the vibration type actuator is decreased from Vm1 to Vm4 (=0). The speed Vm4 is 0, and the corresponding phase difference Pm4 is stored as the initial phase difference (second initial phase difference) Pb in the backward direction in the memory 122.

Figure 7:
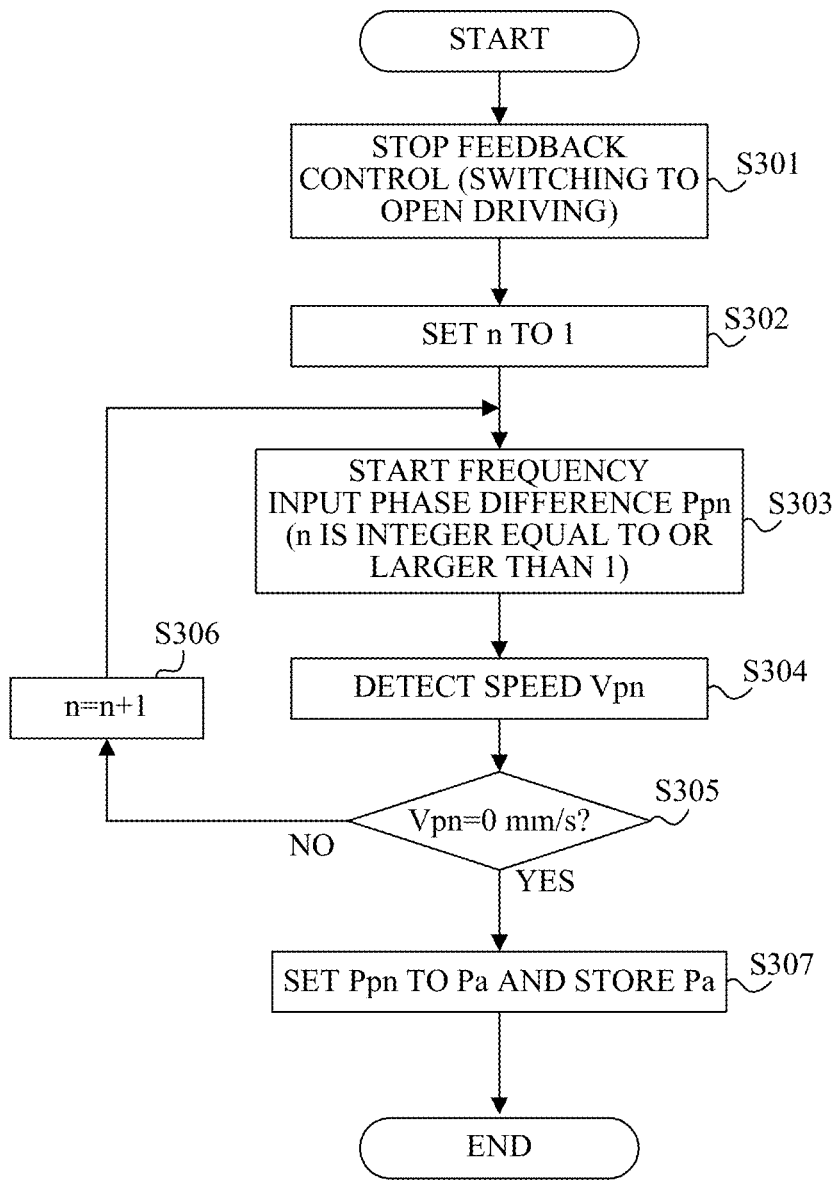
FIG. 7 is a flowchart of a process for detecting a phase difference Pa of the vibration type actuator according to the second embodiment.

A description will be given of a process for calculating the initial phase difference Pa using the flowchart illustrated in FIG. 7. This embodiment is applicable to a lens apparatus having a configuration similar to that of the lens apparatus illustrated in the first embodiment. Those elements, which are corresponding elements in the first embodiment, will be designated by the same reference numerals. The process illustrated in FIG. 7 is executed by the control CPU 127 in accordance with a vibration type actuator control program as a computer program. This is true of the process for calculating the initial phase difference in the backward direction, which will be described later.

Initially, in the step S301, the control CPU 127 stops the feedback and switches to the open driving. Thereby, the drive signal generator 121 generates the two-phase drive signal irrespective of the deviation signal.

Next, in the step S302, the control CPU 127 initializes the counter (counted value) n to 1 so as to determine which number of phase difference is to be set.

Next, in the step S303, the control CPU 127 inputs the frequency (start frequency) and the phase difference Ppn (n is an integer equal to or higher than 1) of the two-phase drive signal to be generated. Ppn is set in a positive range as illustrated in FIG. 6.

Next, in the step S304, the control CPU 127 detects the speed Vpn of the vibration type actuator. In the step S305, the control CPU 127 determines whether the speed Vpn detected in the step S304 becomes 0 or whether the vibration type actuator has stopped. When the speed is not 0, the counter is incremented by 1 in the step S306 so as to continue to detect the change and speed of the phase difference and the flow returns to the step S303. On the other hand, when the speed is 0, the control CPU 127 moves to the step S307 and stores the current phase difference Ppn as the initial phase difference Pa in the forward direction in the phase difference storage 122.

A description will be given of an interval between neighboring phase differences Ppn and Ppn+1 (for example, between Pp1 and Pp2 in FIG. 6). The phase difference interval directly relates to the resolution of the phase difference Pa that provides the speed of 0. It is thus necessary to increase the resolution of the phase difference Pa by reducing the phase difference interval as small as possible.

Figure 9:
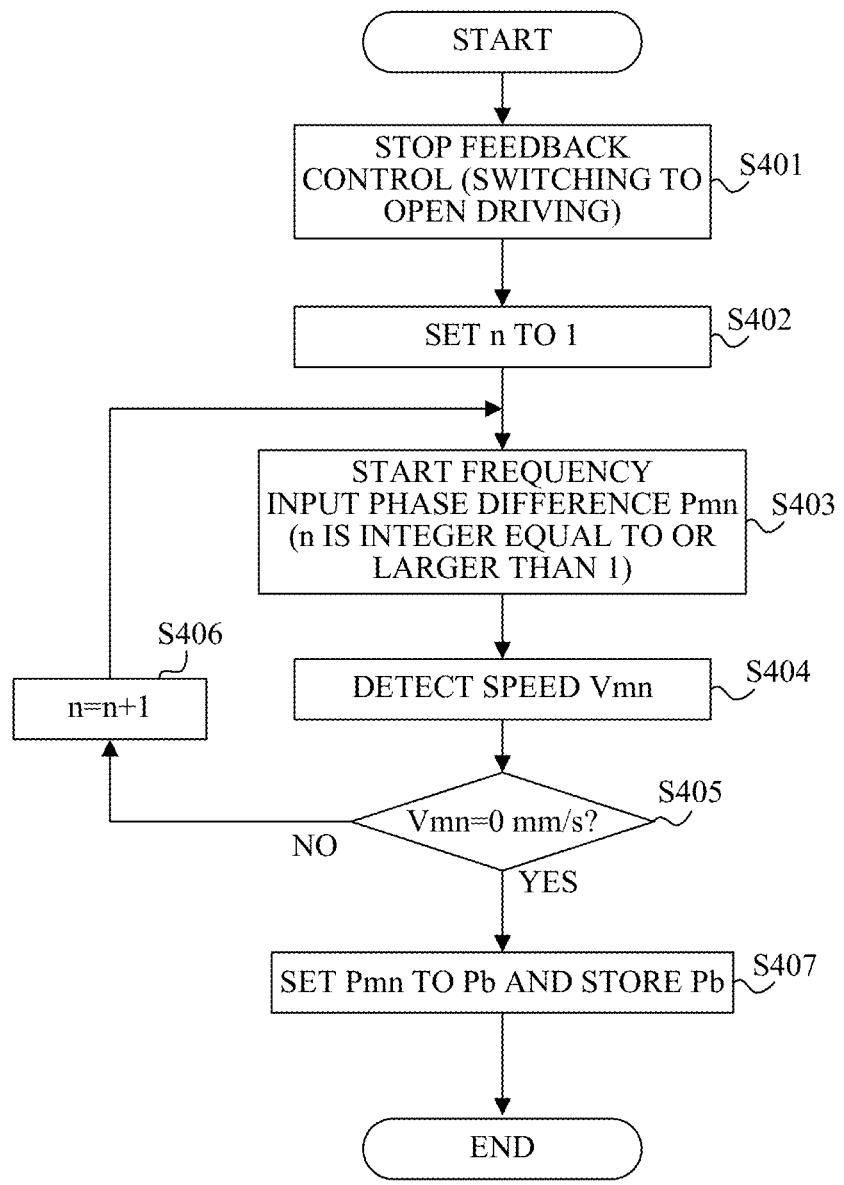
FIG. 9 is a flowchart of a process for detecting a phase difference Pb of the vibration type actuator according to the second embodiment.

A description will be given of a process for calculating the initial phase difference Pb in the backward direction using a flowchart in FIG. 9. Initially, in the step S401, the control CPU 127 stops the feedback control and switches to the open driving. Thereby, the drive signal generator 121 generates the two-phase drive signal irrespective of the deviation signal.

Next, in the step S402, the control CPU 127 initializes the counter (counted value) n to 1 so as to determine which number of phase difference is to be set.

Next, in the step S403, the control CPU 127 inputs the frequency (start frequency) and the phase difference Pmn (n is an integer equal to or larger than 1) of the two-phase drive signal to be generated. Pmn is set in a negative range as illustrated in FIG. 8.

Next, in the step S404, the control CPU 127 detects the speed Vmn of the vibration type actuator. In the step S405, the control CPU 127 determines whether the speed Vmn detected in the step S404 becomes 0 or the vibration type actuator has stopped. When the speed is not 0, the counter is incremented by 1 in the step S406 so as to continue to detect the change and speed of the phase difference and the flow returns to the step S403. On the other hand, when the speed is 0, the control CPU 127 moves to the step S407 and stores the current phase difference Pmn as the initial phase difference Pb in the backward direction in the memory 122.

It is necessary to reduce an interval between neighboring phase differences Pmn and Pmn+1 (such as Pm1 and Pm2 in FIG. 6), and to increase the resolution of the phase difference of the phase difference Pb.

Thus, this embodiment stores the phase differences Pa and Pb as the initial phase differences in the forward and backward directions, where the phase differences Pa and Pb provide the speed of 0 after the phase difference is changed so as to change the speeds of the vibration type actuator in the forward and backward directions.

After storing the initial phase differences Pa and Pb, the control CPU 127 drives the vibration type actuator from the stopped state through the feedback control in accordance with the above control program. In this case, the frequency is fixed onto the start frequency and the two-phase drive signal is generated. The control CPU 127 (drive signal generator 121) sets the phase difference Pa stored in the memory 122 when driving the vibration type actuator in the forward direction and the phase difference Pb stored in the memory 122 when driving the vibration type actuator in the backward direction to the initial value (initial phase difference) of the phase difference for the two-phase drive signal, and thereafter changes the phase difference of the two-phase drive signal from the initial phase difference Pa or Pb of the two-phase drive signal (phase difference control).

This embodiment can reduce the influence of the dead zone irrespective of the drive direction when the vibration type actuator starts moving from the stopped state, and restrain the driving start lag of the vibration type actuator and a difference of the driving start time period between the drive directions. In other words, this embodiment can improve the controllability in the drive start. In particular, even when the relationship between the phase difference and the speed of the vibration type actuator has an individual difference, this embodiment can reduce a drop of the controllability of the vibration type actuator caused by the influence of the dead zone. In addition, a drive noise between the vibrator 103 and the friction member 102 can be reduced from the stopped state to the drive start.

Third Embodiment

Each of the first and second embodiments stops the feedback control of the vibration type actuator, switches to the open driving, and calculates the initial phase difference. In this case, it is necessary to temporarily stop using the lens apparatus (or capturing an image). Accordingly, the third embodiment can reduce the influence of the dead zone of the vibration type actuator while continuing the normal image capturing.

Figure 10:
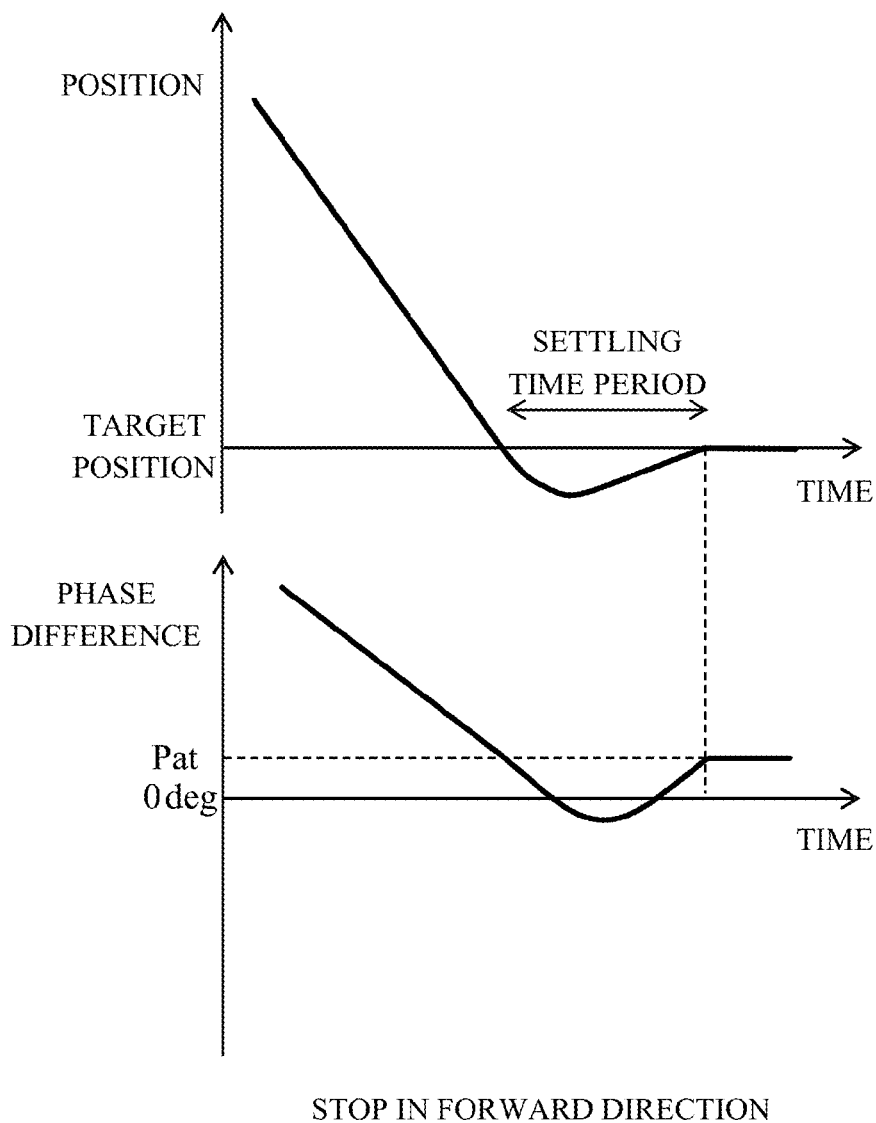
FIG. 10 is a view illustrating a relationship between a position of the vibration type actuator according to a third embodiment of the present invention and time, and a relationship between a phase difference for the vibration type actuator and time.
Figure 11:
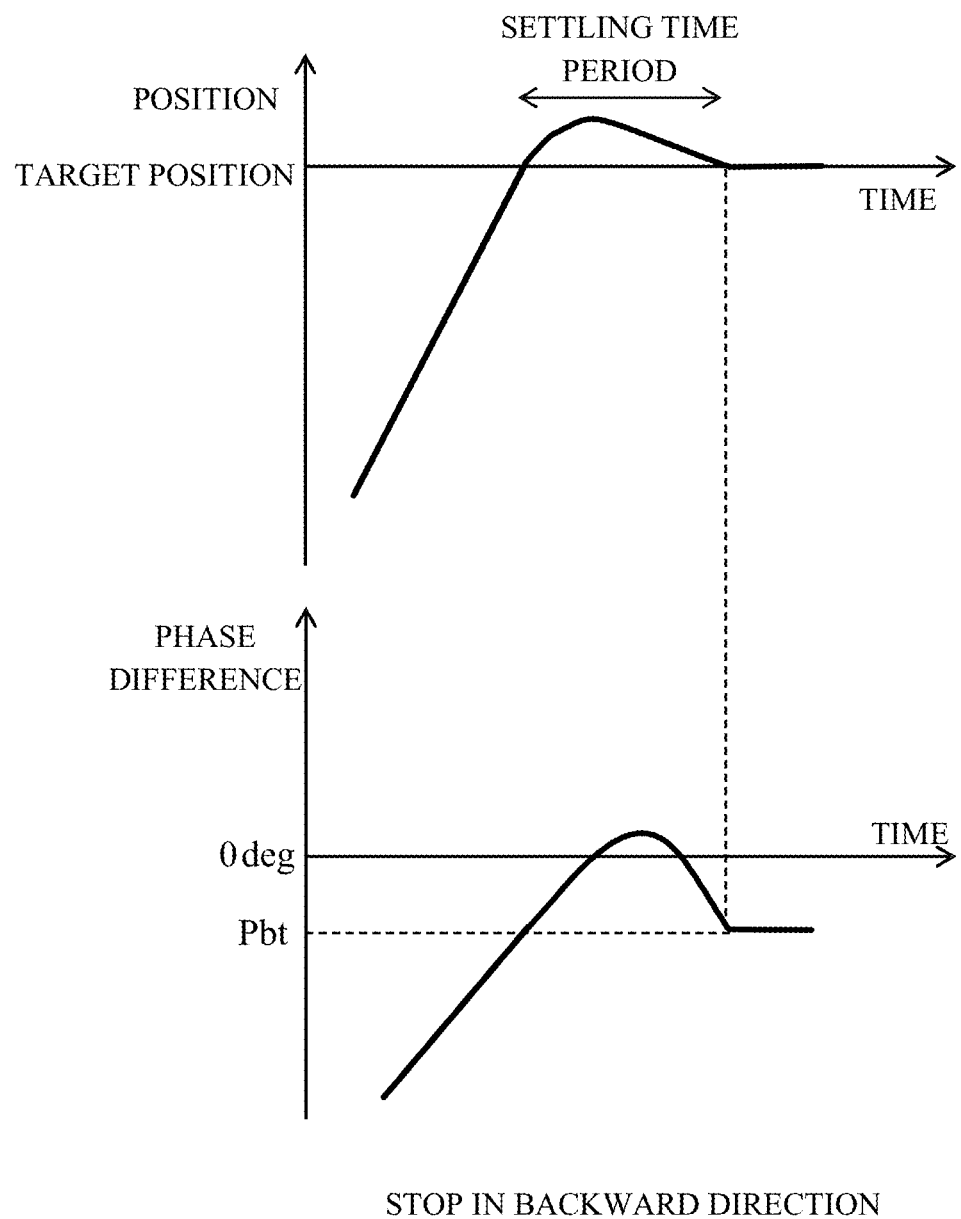
FIG. 11 is another view illustrating a relationship between a position of the vibration type actuator according to the third embodiment and time, and a relationship between a phase difference for the vibration type actuator and time.

FIG. 10 illustrates a relationship among a drive position (or the detected position of the vibrator 103), a phase difference, and time when the vibration type actuator is controlled in forward driving so as to reduce its speed and to stop at the target position. Assume that an initial phase difference (first initial phase difference) Pat in the forward direction is the phase difference when the detected position reaches the target position in the forward direction. FIG. 11 illustrates a relationship among a drive position (or the detected position of the vibrator 103), a phase difference, and time when the vibration type actuator is controlled in backward driving so as to reduce its speed and to stop at the target position. Assume that an initial phase difference (second initial phase difference) Pbt in the backward direction is the phase difference when the detected position reaches the target position in the forward direction. Pat and Pbt are phase differences different from 0° or 180°. A settling time in these figures will be described later.

Figure 12:
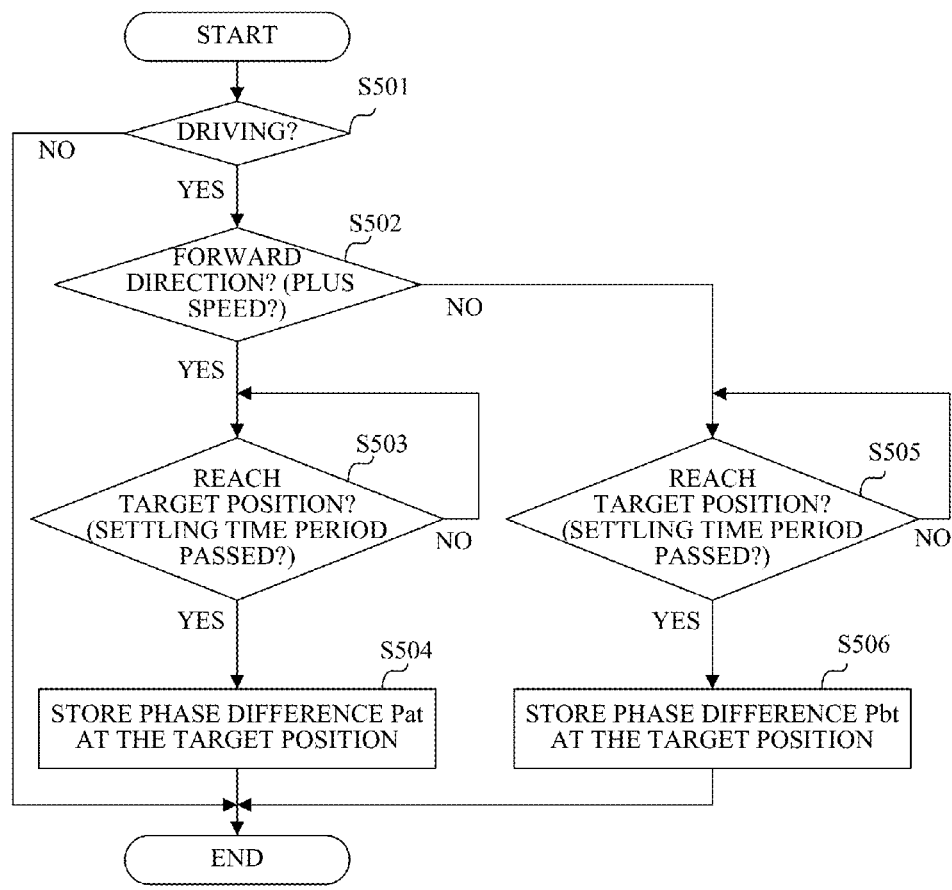
FIG. 12 is a flowchart of a process for detecting a dead zone according to the third embodiment.

A description will be given of a process for calculating the initial phase differences Pat and Pbt through the feedback control using a flowchart illustrated in FIG. 12. This embodiment is applicable to a lens apparatus having a configuration similar to that of the lens apparatus according to the first embodiment. Those elements, which are corresponding elements in the first embodiment, will be designated by the same reference numerals. The process in FIG. 12 is executed by the control CPU 127 in accordance with the vibration type actuator control program as a computer program.

In the step S501, the control CPU 127 determines whether the vibration type actuator is driving. When it is not driving, this process ends. On the other hand, when it is driving, the control CPU 127 moves to the step S502 and determines the driving direction of the vibration type actuator. When the drive direction is a forward direction, the control CPU 127 moves to the step S503. When the drive direction is not the forward direction (or is a backward direction), the control CPU 127 moves to the step S505.

In the steps S503 and S505, the control CPU 127 determines whether the detected position has reached the target position. In this case, the arrival at the target position may be determined by the initial passage of the detected position at the target position, but this embodiment determines that the detected position has reached the target position a settling time period as the predetermined time period after the detected position passes the target position.

FIGS. 10 and 11 illustrate a relationship among the detected position, the phase difference, and time in the settling time period after the detected position passes the target position. After the detected position initially passes, the inertia of the vibration type actuator causes overshooting at the detected position. Thus, the detected position again moves to the target position and is finally settled at the target position after a sign of the phase difference is inversed in the feedback control, etc. Thus, it is a settlement time period from when the detected position initially passes the target position to when the detected position finally stops the target position.

The control CPU 127 repeats this step when determining that the detected position has not yet reached the target position in the step S503, and moves to the step S504 when the detected position reaches the target position. In the step S504, the control CPU 127 stores the current phase difference (when the detected position reaches the target position) as the initial phase difference Pat in the forward direction in the memory 122.

The control CPU 127 repeats this step when determining that the detected position has not yet reached the target position in the step S505, and moves to the step S506 when the detected position has reached the target position.

In the step S506, the control CPU 127 stores the current phase difference as the initial phase difference Pbt in the backward direction in the memory 122.

After storing the initial phase differences Pat and Pbt, the control CPU 127 drives the vibration type actuator from the stopped state through the feedback control in accordance with the above control program. In this case, the frequency is fixed onto the start frequency and the two-phase drive signal is generated. The control CPU 127 (drive signal generator 121) sets the phase difference Pat stored in the memory 122 when moving the vibration type actuator in the forward direction and the phase difference Pb stored in the memory 122 when moving the vibration type actuator in the backward direction to the initial value (initial phase difference) of the phase difference of the two-phase drive signal, and thereafter changes (increases) the phase difference of the two-phase drive signal from the initial phase difference Pat or Pbt of the two-phase drive signal (phase difference control).

Figure 13:
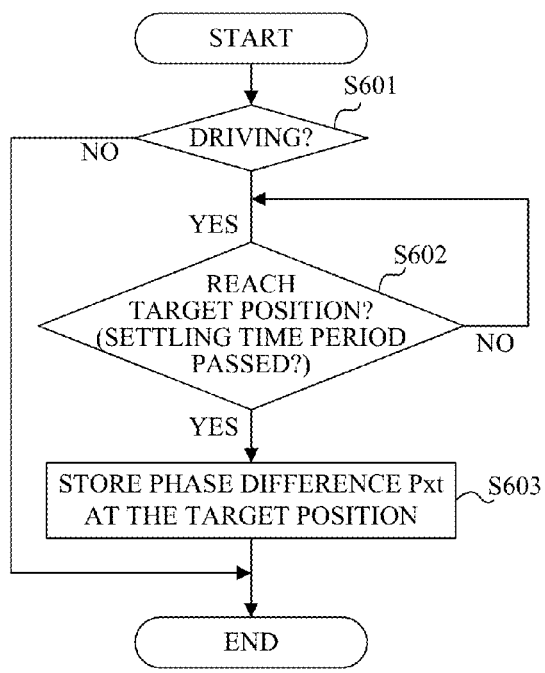
FIG. 13 is another flowchart of a process for detecting a dead zone according to the third embodiment.

While FIG. 12 illustrates the process for detecting the initial phase difference for each drive direction of the vibration type actuator, the process may be simplified as illustrated in the flowchart in FIG. 13 and the process phase difference may be detected without considering the drive direction.

In the step S601, the control CPU 127 determines whether the vibration type actuator is driving. When it is not driving, this process ends. When it is driving, the control CPU 127 moves to the step S602 and determines whether the detected position as the drive position of the vibration type actuator has reached the target position. When the detected position has not yet reached the target position, the control CPU 127 repeats this process, and when it has reached the target position, the control CPU 127 moves to the step S603.

In the step S603, the control CPU 127 stores the current phase difference (when the detected position reaches the target position) as the initial phase difference Pxt in the backward direction in the memory 122. Thereafter, the control CPU 127 fixes the frequency of the two-phase drive signal to the start frequency and changes (increases) the phase difference of the two-phase drive signal from the initial phase difference Pxt irrespective of the drive direction (phase difference control) when the vibration type actuator is driven from the stopped state.

This simplified process is suitable for the vibration type actuator that is repetitively driven in the same drive direction, as seen in focus lens driving in the autofocus in the image capturing apparatus.

This embodiment can reduce the influence of the dead zone irrespective of the drive direction when the vibration type actuator starts moving from the stopped state without stopping the feedback control, and restrain the driving start lag of the vibration type actuator and a difference of the driving start time period between the drive directions. In other words, this embodiment can improve the controllability in the drive start. In particular, even when the relationship between the phase difference and the speed of the vibration type actuator has an individual difference, this embodiment can reduce a drop of the controllability of the vibration type actuator caused by the influence of the dead zone. In addition, a drive noise between the vibrator 103 and the friction member 102 can be reduced from the stopped state to the drive start.

In order to calculate the initial phase difference by driving the vibration type actuator through the feedback control in the lens apparatus, this embodiment does not calculate the initial phase difference just after the lens apparatus is started. Thus, in driving just after starting, the initial phase difference calculated in the previous power off is stored in a nonvolatile memory, and the vibration type motor may be started from the previous initial phase difference.

This embodiment may be combined with the first or second embodiment. More specifically, just after start, the initial phase difference Px or Pa and Pb described in the first or second embodiment may be calculated and stored by the open driving. When the initial phase differences Pat and Pbt (or Pxt) are obtained by the subsequent feedback control, switching is performed so that the driving starts using this initial phase difference. Thereby, irrespective of the individual scattering of the vibration type actuator, and the controllability can improve.

Fourth Embodiment

Figure 14:
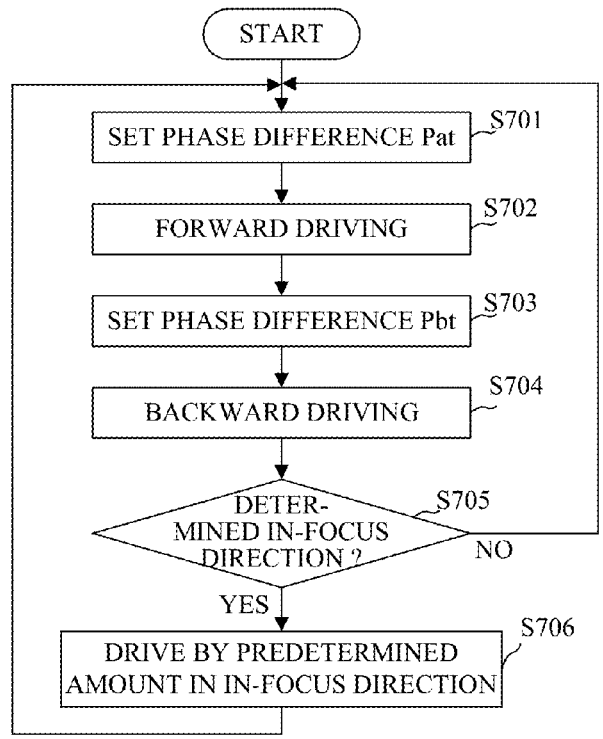
FIG. 14 is a flowchart of a wobbling control in a lens apparatus according to a fourth embodiment of the present invention.

The flowchart in FIG. 14 illustrates a wobbling control process of a lens 105 (focus lens in this embodiment) where the lens apparatus provides a contrast detection type autofocus ("TV-AF"). The wobbling control moves the lens 105 by a micro amount in the forward and backward directions alternately so as to find a direction (in-focus direction) in which a contrast evaluation value obtained from the image capturing signal is higher. In other words, this control repetitively switches the driving direction of the vibration type actuator.

This embodiment describes the wobbling control using the initial phase differences Pat and Pbt obtained in the third embodiment. Px obtained in the first embodiment or Pa and Pb obtained in the second embodiment may be used.

In the step S701, the control CPU 127 reads the initial phase difference Pat in the forward direction from the memory 122 and sets it to the phase difference of the two-phase drive signal. In the step S702, the two-phase drive signal is generated so as to drive the vibration type actuator in the same direction from the stopped state until the lens 105 is moved by the predetermined micro amount in the forward direction from the stopped position. In this case, the frequency of the two-phase drive signal is fixed to the start frequency and the phase difference control is performed from the initial phase difference Pat.

Next, in the step S703, the control CPU 127 reads the initial phase difference Pbt in the backward direction from the memory 122 and sets it to the phase difference for the two-phase drive signal. In the step S704, the two-phase drive signal is generated so as to drive the vibration type actuator in the same direction from the stopped state until the lens 105 is moved by the predetermined micro amount in the backward direction from the stopped position. In this case, the frequency of the two-phase drive signal is fixed onto the start frequency, and the phase difference control is performed from the initial phase difference Pbt.

Next, in the step S705, the control CPU 127 determines whether the illustrated focus controller has obtained the in-focus direction in which the contrast evaluation value increases in the micro reciprocal drive of the lens 105 in the steps S703 and S704. When the in-focus direction has been acquired, the control CPU 127 moves to the step S706, and drives the vibration type actuator from the stopped state so as to move the position of the lens 105 by the predetermined amount in the in-focus direction. Even in this case, when the vibration type actuator is moved in the forward direction, the phase difference control is performed from the initial phase difference Pat. When the vibration type actuator is moved in the backward direction, the phase difference control is performed from the initial phase difference Pbt. Then, the flow returns to the step S701 so as to repeat the micro reciprocal drive of the lens 105. When the in-focus direction is not obtained, the flow returns to the step S701 from this step.

Thus, this process is repeated until the focus controller finally settles the in-focus direction and the in-focus position as the position of the lens 105 that maximizes the contrast evaluation value.

This wobbling control may repeat driving and stopping of the lens 105 by the vibration type actuator as quickly as possible. A phase difference control from an initial phase difference different from 0° or 180° described in the third embodiment (or the first and second embodiments) can restrain a driving start lag and a difference of the drive start time period between the drive directions, and provide a good wobbling control.

While each of the above embodiments installs a vibration type actuator control apparatus in the lens apparatus used for image capturing, the phase difference control described in each embodiment is applicable to another type of apparatus configured to drive a driven member using the vibration type actuator.

Each of the above embodiments can reduce a deterioration of a controllability of the vibration type actuator (in particular moving start of the moving body) caused by a dead zone although a relationship between a phase difference and a speed of a vibration type actuator has an individual difference.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-000532, filed Jan. 5, 2016, which is hereby incorporated by reference herein in its entirety.

What is claimed is:

1. A vibration type actuator control apparatus configured to control driving of a vibration type actuator configured to move a moving body that is one of the vibrator and a contact body that contacts a vibrator, the vibration type actuator including the vibrator in which a vibration is excited when a two-phase drive signal having a phase difference is applied to an electro-mechanical energy conversion element, the vibration type actuator control apparatus comprising a drive signal generator configured to generate the two-phase drive signal, wherein the drive signal generator changes a phase difference of the two-phase drive signal from an initial phase difference when the moving body is moved from a stopped state, the initial phase difference being determined based on a phase difference shift indicative of a shift from a phase difference set so as to stop the moving body.

2. The vibration type actuator control apparatus according to claim 1, wherein the drive signal generator provides a feedback control that changes a phase difference based on a deviation between a target position and a detected position obtained by detecting a position of the moving body, and wherein the initial phase difference is the phase difference when the detected position reaches the target position by the feedback control or a predetermined time after the detected position reaches the target position.

3. The vibration type actuator control apparatus according to claim 1, wherein the initial phase difference is a first initial phase difference that provides a speed of the moving body of 0 when the phase difference is changed so as to decrease the speed of the moving body in a first moving direction, or a second initial phase difference that provides a speed of the moving body of 0 when the phase difference is changed so as to decrease the speed of the moving body in a second moving direction opposite to the first moving direction, and wherein the drive signal generator changes the phase difference from the first initial phase difference when the moving body is moved from the stopped state in the first moving direction, and changes the phase difference from the second initial phase difference when the moving body is moved from the stopped state in the second moving direction.

4. The vibration type actuator control apparatus according to claim 1, wherein where one of a positive side and a negative side of the phase difference is decreased and the other of the positive side and the negative side is increased, the initial phase difference is a center phase difference between a first phase difference when the moving body stops moving in a first moving direction and a second phase difference when the moving body starts moving in a second moving direction opposite to the first moving direction.

5. The vibration type actuator control apparatus according to claim 1, wherein the phase difference is changed with an equal change rate from the initial phase difference in each of a positive direction and a negative direction, where a drive start time is defined as a time period from when the phase difference starts changing from the initial phase difference to when the moving body starts moving, and wherein the initial phase difference minimizes a time difference between the drive start time when the phase difference is moved in the positive direction and the drive start time when the phase difference is moved in the negative direction.

6. The vibration type actuator control apparatus according to claim 1, wherein the drive signal generator fixes a frequency of the two-phase drive signal in changing the phase difference from the initial phase difference.

7. An apparatus comprising:
a vibration type actuator that includes a vibrator in which a vibration is excited when a two-phase drive signal having a phase difference is applied to an electro-mechanical energy conversion element, a contact body that contacts the vibrator, the vibration type actuator being configured to move a moving body that is one of the vibrator and the contact body; and
a controller configured to generate the two-phase drive signal and to control driving of the vibration type actuator,
wherein the controller changes a phase difference of the two-phase drive signal from an initial phase difference when the moving body is moved from a stopped state, the initial phase difference being determined based on a phase difference shift indicative of a shift from a phase difference set so as to stop the moving body.

8. The apparatus according to claim 7, wherein the controller switches the vibration type actuator so as to repeat reciprocal drive of the moving body.

9. A non-transitory computer-readable storage medium for storing a program for controlling driving of a vibration type actuator configured to move a moving body that is one of a vibrator and a contact body that contacts a vibrator, the vibration type actuator including the vibrator in which a vibration is excited when a two-phase drive signal having a phase difference is applied to an electro-mechanical energy conversion element, the program comprising the steps of:
setting an initial phase difference of the two-phase drive signal when the moving body is moved from a stopped state; and
changing a phase difference of the two-phase drive signal from the initial phase difference,
wherein the initial phase difference is determined based on a phase difference shift indicative of a shift from the phase difference set so as to stop the moving body.

10. A vibration type actuator control apparatus configured to control driving of a vibration type actuator configured to move a moving body that is one of a vibrator and a contact body that contacts a vibrator, the vibration type actuator including the vibrator in which a vibration is excited when a two-phase drive signal having a phase difference is applied to an electro-mechanical energy conversion element, the vibration type actuator control apparatus comprising a drive signal generator configured to generate the two-phase drive signal,
wherein the drive signal generator changes a phase difference of the two-phase drive signal from an initial phase difference when the moving body is moved from a stopped state, the initial phase difference being determined based on a phase difference when the moving body stops from a drive state.

11. A non-transitory computer-readable storage medium for storing a program for controlling driving of a vibration type actuator configured to move a moving body that is one of a vibrator and a contact body that contacts a vibrator, the vibration type actuator including the vibrator in which a vibration is excited when a two-phase drive signal having a phase difference is applied to an electro-mechanical energy conversion element, the program comprising the steps of:
setting an initial phase difference of the two-phase drive signal when the moving body is moved from a stopped state; and
changing a phase difference of the two-phase drive signal from the initial phase difference,
wherein the initial phase difference is determined based on a phase difference when the moving body stops from a drive state.

\* \* \* \* \*